United States Patent [19]

Ishida et al.

[11] Patent Number: 5,138,485
[45] Date of Patent: Aug. 11, 1992

[54] OPTICAL FILTER FOR MEASUREMENT OF COMBUSTION GASES AND METHOD OF MANUFACTURING

[75] Inventors: Masahiko Ishida; Syuji Takada; Toshikazu Ohnishi, all of Miyanohigashi, Japan

[73] Assignee: Horiba, Ltd., Kyoto, Japan

[21] Appl. No.: 556,847

[22] Filed: Jul. 20, 1990

[30] Foreign Application Priority Data

Jul. 25, 1989 [JP] Japan .................................. 1-87250

[51] Int. Cl.$^5$ .................................................. G02B 5/28
[52] U.S. Cl. ...................................... 359/359; 156/107; 359/589; 359/590
[58] Field of Search ................ 350/1.6, 1.7, 164, 166; 359/359, 589, 590; 156/101, 107

[56] References Cited

U.S. PATENT DOCUMENTS

| | | | |
|---|---|---|---|
| 2,907,672 | 10/1959 | Irland et al. | 350/1.7 |
| 3,192,575 | 7/1965 | Rosenau, Jr. et al. | 350/1.7 |
| 3,269,267 | 8/1966 | Collins | 350/1.6 |
| 3,398,040 | 8/1968 | Allen et al. | 350/1.7 |
| 3,514,175 | 5/1970 | Jenkins | 350/1.6 |
| 4,382,177 | 5/1983 | Heaney | 350/1.6 |
| 4,487,197 | 12/1984 | Hoyois | 350/1.7 |
| 4,593,197 | 6/1986 | Miyatake et al. | |
| 5,008,143 | 4/1991 | Armanini | 350/166 |

Primary Examiner—Rodney B. Bovernick
Assistant Examiner—Martin Lerner
Attorney, Agent, or Firm—Price, Gess & Ubell

[57] ABSTRACT

A measuring instrument that must transmit predetermined wavelengths of optical radiation has an optical filter assembly that can be conveniently manufactured. The optical filter assembly can be coated to provide optical coatings on either side of the substrate, and a masking layer can be deposited to encompass the peripheral edges of the optical coatings and exposed portions of the substrate to eliminate the problem of optical noise resulting from optical radiation contact with the edges of the coating layers.

25 Claims, 3 Drawing Sheets

OPTICAL FILTER FOR MEASUREMENT OF COMBUSTION GASES AND METHOD OF MANUFACTURING

BACKGROUND OF THE INVENTION

1. Field of the Invention

The present invention relates to an improved optical filter and method of making the same for use in the measurement of combustion gas such as air-to-fuel ratio meters.

2. Description of Related Art

Optical filters and, particularly, optical filters utilized in measuring instruments for measuring the components in a gas by transmitting light through a chamber containing the gas, and determining the effect of the components in the gas on the transmission of the light, are known in the prior art. For example, in the analysis of the by-products resulting from the combustion of gasoline in a vehicle, gas analyzers such as an air-to-fuel ratio meter are utilized wherein light such as infrared light is transmitted through the combustion chamber, and a detector determines the intensity of the light that passes through the combustion gases. The combustion chamber is fitted with an optical filter assembly to permit the transmission of a desired bandwidth of radiation in order to determine the effects of the components in the combustion gas on that particular radiation.

Referring to FIG. 7, a schematic cross-sectional view of a prior art optical filter is disclosed, wherein a substrate 21 transmissible to infrared rays is formed, for example, of materials such as silicon (Si) and silica (sapphire). A band-pass surface layer 22 (hereinafter referred to as a BP surface) is capable of passing an appointed wavelength band of infrared radiation into the substrate. A second optical filter, such as a short-long cutting surface 23 (hereinafter referred to as a SLC surface), also provides a band-pass transmission capable of cutting the shorter spectrum wavelength band and the longer spectrum wavelength band of infrared rays to remove any noise components not necessary for the purpose of detecting the effect of the components in the combustion gas on the radiation. Generally, the BP surface 22 and the SLC surfaces 23 are formed of multilayer film depositions comprising, for example, germanium (Ge) and silicon monoxide (SiO), as known in the prior art.

Normally, the BP surface 22 is relatively thinly coated all over the surface of the substrate 21, and the SLC surface 23 is deposited to be considerably thicker than the BP surface 22. The SLC surface 23 has also been conventionally formed to be slightly smaller in dimension than the substrate 21, so that all the circumferential or peripheral portions of the substrate 21 will be exposed.

In the production of the conventional optical filter assembly, a masking plate 25, which is shown in an open configuration in FIG. 8, has a plurality of perforated portions 24 formed at spaced intervals corresponding to the desired SLC surface 23 that are to be deposited on the common substrate 26. The thinner BP surface 22 is deposited across the entire lower surface, as shown in FIG. 8. During the production, the mask plate 25 is mounted on the surface of the substrate slab 26, and two different kinds of material can then be vapor coated in a vacuum process to form the plurality of SLC surfaces 23 in a side by side arrangement on the substrate 26. Spaced between each of the SLC surfaces 23 are exposed portions of the substrate to provide cutting intervals 27. Subsequently in the production step, the substrate slab 26 and the coating BP surface 22 are cut along the cutting intervals 27 to form a plurality of optical filters.

It is necessary to form the SLC surfaces 23 in spaced individual portions on the slab substrate 26 and thereby provide the cutting intervals 27, because problems will occur if the SLC surfaces 23 extend over the entire slab substrate 26. A problem of tipping occurs during the cutting step so that an irregular side peripheral surface to the coating layer is provided. This irregular surface can provide interference problems with incident light. This problem is particularly acute with the relatively thick SLC surface, although the problem also occurs in a minor fashion with regard to the BP surface. Accordingly, the cutting intervals 27 are formed between the SLC surfaces during the production prior to the cutting step to eliminate this problem. Reference can be made to FIG. 7 for an example of the irregular edge 28 that could occur, and represents the tipping problem referred to above. If there is also a desire to eliminate any tipping on the BP surface 22, it is advantageous that the substrate 26 not be formed of an opaque material such as Si, and that the substrate rather be formed of a transparent material such as silica, to enable accurate alignment in the cutting procedure. Thus, if the substrate 26 is formed of a transparent material such as silica and sapphire, it would be possible to confirm the position of the BP surface portions 22 (not shown) and the SLC surface portions 23 during their formation. The BP surface portions 22 can then be equal to the SLC surfaces 23 in size and position, thereby eliminating the necessity of cutting the BP surface 22.

This solution, however, presents additional problems in that even if the BP surface portions 22 and the SLC surface portions 23 are formed equal in size to each other, there is still a possibility that they can be slightly shifted in spatial position, or could be slightly different in size, and thereby bring about an unmatched or nonoverlaid portion through which light can leak. In addition, when the substrate 26 must be formed of an opaque material such as Si, it is then additionally difficult to visually confirm the actual positions of the BP surface 22 and the SLC surfaces 23 so that problems associated, for example, with positional shifting between the respective BP surface 22 and SLC surfaces 23 are more likely to occur during production.

In applications where the area of the SLC surface 23 and the BP surfaces 22 are comparatively large, the leakage of light can be eliminated by utilizing only a central portion of the filter. Industry, however, is trying to make measuring instrumentation as small as possible commensurate with the reduced size of electronics. In an optical figure having a comparatively reduced area for both the BP surface 22 and the SLC surfaces 23, it is particularly difficult to remove any possibility of leakage resulting from irregularly formed and cut peripheral filter coating edges.

For example, in a was analyzer detector that is seeking to simultaneously measure three separate ingredients or components in a gas, at least four optical filters are required to be mounted on a vessel usually made of metal. One of the optical filters generally provides a standard reference, while the others are dedicated to each of the individual ingredients or components that are desired to be measured. If a leakage of light occurs in any of one optical filters, the interferential value is increased, and a highly accurate measurement of the three components cannot be achieved. Additionally, if there is a leakage of light, then the optical filters must be exchanged, and it is frequently difficult to replace such filters on a combustion chamber.

In order to improve measurement instruments for measuring the components in combustion gases by transmitting light through optical filter assemblies, it is highly desirable that the optical filter be manufactured so that there is no possibility of a leakage of light to interfere with the measurement calculations.

The prior art is still seeking to optimize the use of optical filter assemblies for measuring instrumentations.

SUMMARY OF THE INVENTION

The present invention addresses the above described problems by providing an optical filter assembly that removes the effect of any tipping or irregular peripheral edges on either the BP surface or the SL surface of an optical filter.

The improved optical filter assembly of the present invention includes a substrate with a first and second surface and peripheral sides that is transparent to the predetermined wavelengths of optical radiation to be used with the filter. A first coating layer is deposited on the first surface of the substrate to form a first band-pass filter transmissible to infrared radiation, and preferably spaced inward from the substrate peripheral side. A second coating layer on the second surface of the substrate forms a second band-pass filter and is spaced inward from the substrate peripheral side. A third masking coating layer extends about and over the peripheral edges of the first and second coating layers and is positioned adjacent to the substrate peripheral sides to reflect infrared radiation, whereby optical noise resulting from infrared radiation contact with the edges of the coating layers can be eliminated. The third masking coating layer can either sandwich the peripheral sides of the substrate or extend over and encompass the substrate sides. The third masking coating layer can, for example, be made with a first layer of chromium and a second layer of gold overlaying the chromium.

The method of production includes providing a substrate transparent to the predetermined wavelengths of radiation desired to be passed through the filter. Predetermined segments of the substrate are exposed to the deposition of both a first coating layer and a second coating layer to form respective filter layers. The substrate is cut into individual portions, and the edges of the respective filter layers are then coated with a masking layer to extend over and about the edges. The masking layer prevents transmission of optical radiation from contacting the edges whereby optical noise resulting from radiation contact can be eliminated.

The features of the present invention, which are believed to be novel, are set forth with particularity in the appended claims. The present invention, both as to its organization and manner of operation, together with further objects and advantages, may best be understood by reference to the following description, taken in conjunction with the accompanying drawings.

DESCRIPTION OF THE PREFERRED EMBODIMENTS

The following description is provided to enable any person skilled in the field of manufacturing measurement instruments utilizing optical filters to make and use the invention and sets forth the best modes contemplated by the inventors of carrying out their invention. Various modifications, however will remain readily apparent to those skilled in these arts, since the generic principles of the present invention have been defined herein specifically to provide a relatively economical optical filter and process for manufacturing the same.

The optical filter assembly of the present invention is particularly adapted to provide an improved performance in the manufacture of gas analyzing instruments and to improve the options available in the manufacturing steps of such optical filters. An example of a gas analyzer is shown in U.S. Pat. No. 4,593,197, which is incorporated herein by reference. For example, a band-pass surface can be formed on one side of a substrate, with an additional band-pass filter or SLC surface formed on the other side of the substrate, with these optical coating layers being of a slightly smaller size in comparison with the base substrate, to provide an exposed portion of the substrate around the peripheral edges of the optical coatings. These peripheral edges can then be coated with a masking layer formed from a material capable of reflecting infrared rays. As a result of the masking step, the BP surface may be equal to the SLC surface in area, but they can also be slightly shifted in position or have variations in their respective areas. The masking layer may be formed to extend from the circumferential portion of the BP surface and the SLC surfaces to a side surface of the substrate. If the side surface of the substrate is coated with the mask to, in effect, encompass the substrate edges, the leakage of light from the side surface of the substrate can be prevented. By utilizing the procedure of masking the side surfaces of the coating layers, the problems of an irregular coating layer or tipping effect can be removed, since it is not necessary to then cut the BP surface or the SLC surfaces when the substrate slab is cut into smaller filter assemblies.

Figure 1:
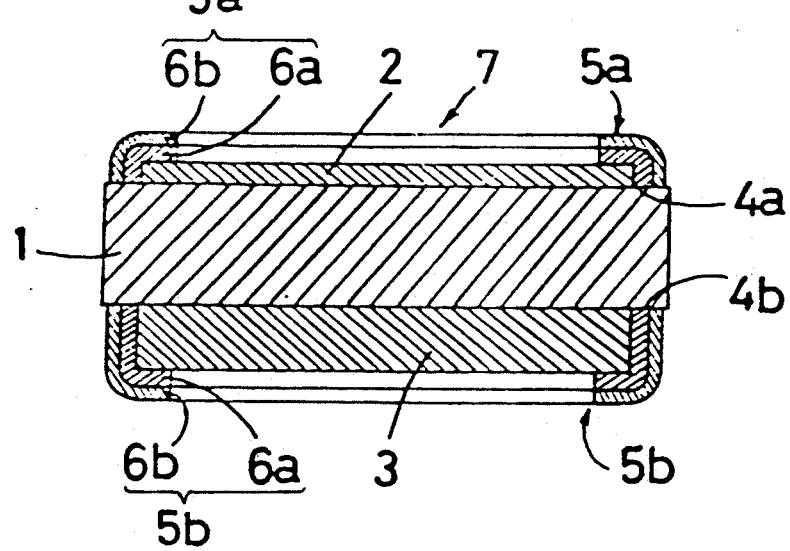
FIG. 1 is a cross-sectional schematic view of the first embodiment of the present invention.

Referring to FIG. 1, an optical filter assembly 7 includes a substrate 1 that is transmissible to infrared rays such as silicon (Si), silica (sapphire), and barium fluoride. A first optical coating layer or band-pass surface 2 is formed on one side of the substrate, while a second optical coating layer or SLC surface 3 can be formed on the opposite side of the substrate. For example, the BP surface 2 and the SLC surface 3 can be formed of a multilayer film construction comprising, for example, germanium (Ge) and silicon monoxide (SiO) that can be formed by a vacuum vapor coating, as known in the art.

The respective BP surface 2 and SLC surface 3 are slightly reduced in size in comparison with the peripheral edges of the substrate 1 to provide exposed portions 4a and 4b on both sides of the substrate 1. A multicoated masking layer 5a and 5b capable of reflecting infrared rays can be specifically formed on the respective circumferential portions of the BP surface 2 and the SLC surface 3 on the exposed portions 4a and 4b, respectively. This masking layer can be formed, for example, by a chromium layer 6a that is then coated with a gold AU layer 6b.

Figure 2:
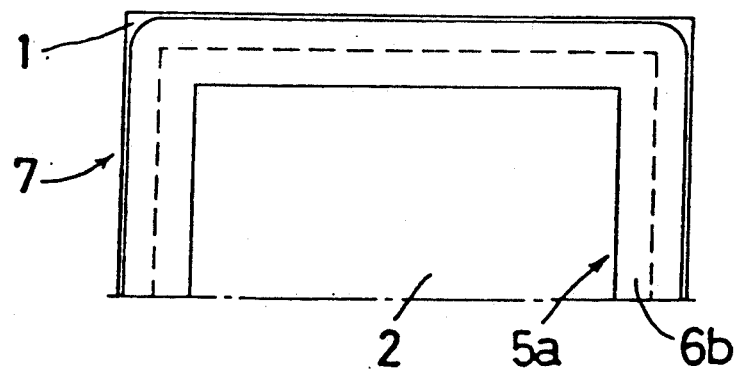
FIG. 2 is a partial cut plan view.

Referring to FIG. 2, the optical filter assembly 7 is disclosed in a plan view, with the perimeter mask 5a disclosed in relationship to the BP surface 2. The dotted line refers to the inward offset of the BP surface 2 from the outer peripheral edge of the substrate 1.

The formation of the BP surface 2 and SLC surfaces 3 of the optical filter are in accordance with the conventional methods of manufacturing the same and, accordingly, a detailed disclosure is not necessary herein. For example, the substrate 1 can be covered with a masking plate with a subsequent vapor deposition to form the optical coating surfaces.

Figure 3:
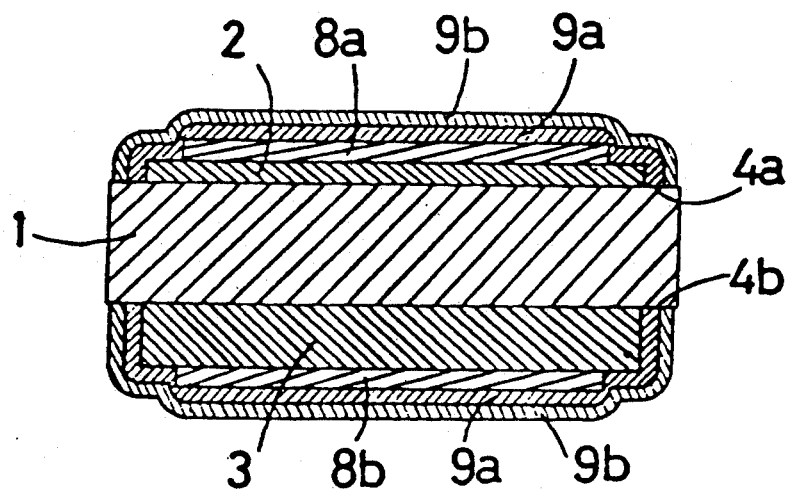
FIG. 3 is a cross-sectional view of the substrate during the mass form procedure step.

Formation of the masking coating layer can be accomplished, for example, as shown in FIG. 3. In this coating step, a photoresist coating 8a and 8b respectively cover the desired transmission areas of the BP surface 2 and the SLC surface 3. Conventional photoresist coatings can be utilized that are soluble to solvents such as acetone. The mask is then formed by depositing the chromium layer, for example, through a vapor coating, and then subsequently the gold layer, again through a vapor coating procedure. Alternatively, a sputtering procedure could be used to form the coatings. An acetone, for example, can be applied to the structure shown in FIG. 3 to remove the photoresist 8a and 8b and the overlaying masking layers 9a and 9b, to produce the filter assembly shown in FIG. 3. Thus, the optical filter assembly 7 will have on its substrate 1 exposed surface areas 4a and 4b to define the cutting parameters of the substrate slab. As a result, in the cutting step shown, for example, in FIG. 5, the comparatively thin BP surface 2 and the thick SLC surface 3 will not be cut in the dicing procedure and no tipping problems will be created. Since the entire peripheral surface of the BP surface 2 and the SLC surface 3 will be covered with the mask 5a and 5b to reflect infrared rays, even positional shifting between the respective BP surface 2 and the SLC surface 3 can be compensated for by the width of the mask 5a and 5b. Accordingly, any optical noise resulting from optical radiation contact with the edges of these coating layers can be eliminated. Since this masking procedure step provides increased tolerance in the manufacturing steps, the positioning of the BP surface 2 and the SLC surfaces 3 are reduced in tolerance requirements. Therefore, the substrate 1 can be formed of not only a transparent material such as silica and sapphire, but also opaque material such as Si. As a result, an optical filter assembly that is superior in reliability can be achieved, even though reduced areas of the BP surface 2 and the SLC surface 3 are required for their application in a measurement instrument. The masking layers can be formed of material such as chromium, nickel, and aluminum, but in the preferred embodiment, a chromium layer is utilized with an overlaying layer of gold. This overlaying layer increases the strength of the chromium layer to thereby avoid frictional damage, while ensuring the reflection of infrared rays. Thus, in the application of measuring combustion gases, for example, in a high-speed air-to-fuel ratio meter wherein a detector must measure three components in the combustion gases at the same time, such as HC, $CO_2$, CO, there will be no possibility of leakage of light through the respective optical filters, even though four filters must be installed into the measuring chamber.

Figure 4:
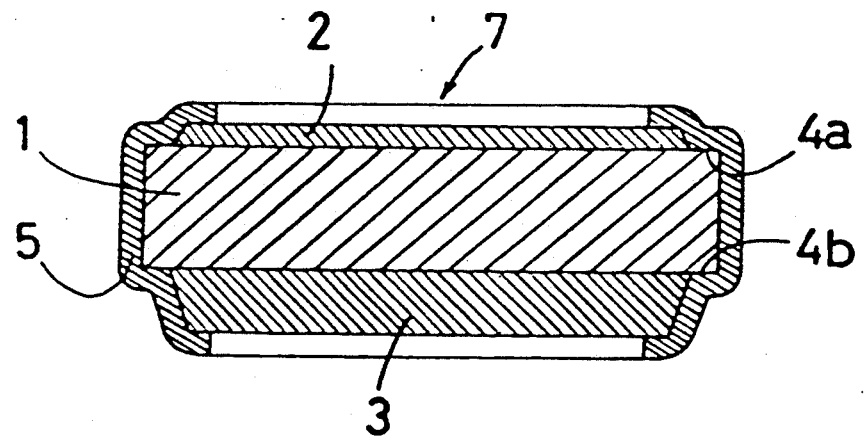
FIG. 4 is a cross-sectional view of a second embodiment of the present invention.
Figure 5:
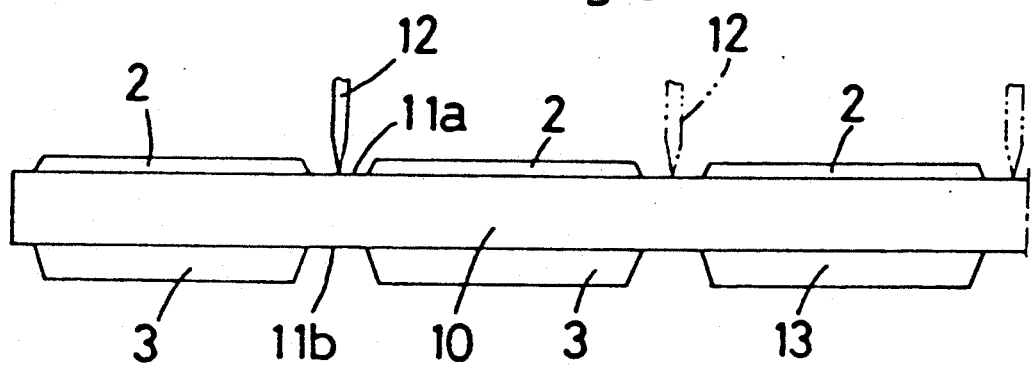
FIG. 5 is a schematic end view disclosing the cutting step of the present invention.
Figure 6:
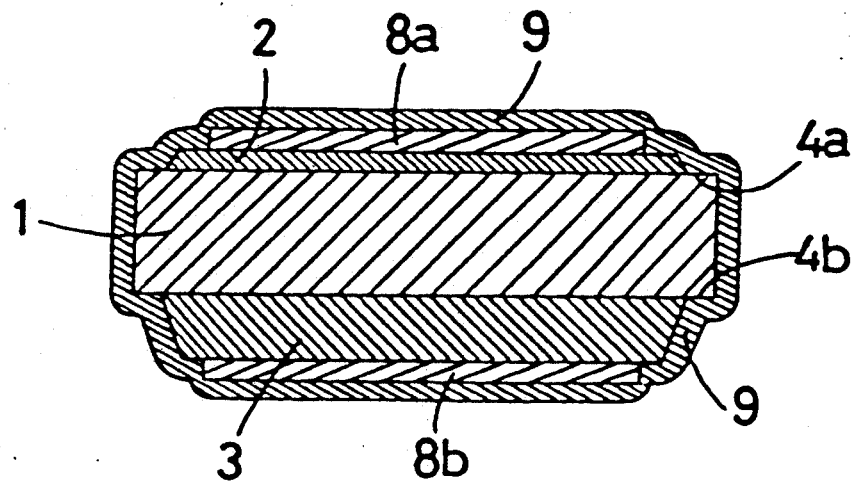
FIG. 6 is a cross-sectional view showing the mask forming step of the second embodiment of the present invention.
Figures 7, 8:
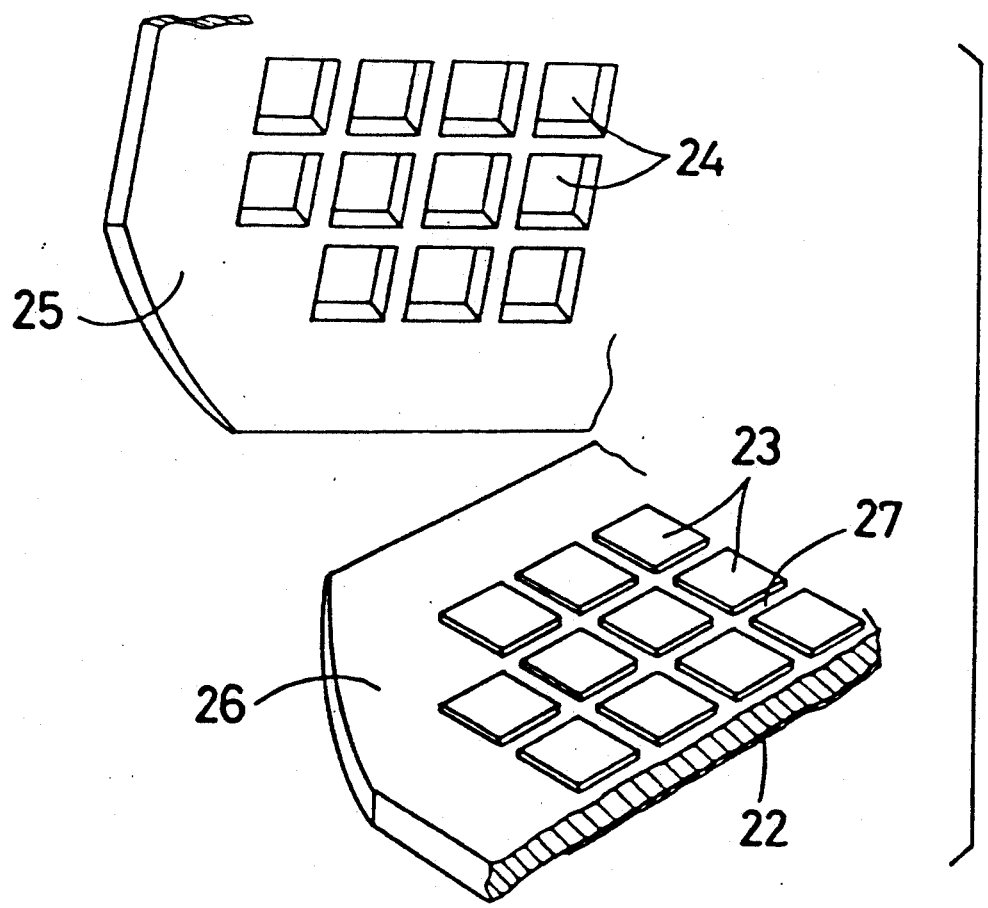
FIG. 7 is a schematic side view of a prior art filter section.
FIG. 8 is a perspective view of a prior art production of optical filters.

Referring to FIGS. 4 through 6, a second embodiment of the present invention is disclosed. In this embodiment, similar drawing numerals will designate elements similar to that of the first embodiment. A substrate 1 can be formed of optical materials, such as silicon and the like, that are transmissible to infrared rays. The BP surface 2 is formed on one side thereof, and an SLC surface 3 is formed on the other side. The BP surface 2 and the SLC surface 3 are slightly smaller in size than the base substrate 1.

Reference numeral 5 defines a mask capable of reflecting infrared rays and extending from the respective circumferential portions of the BP surface 2 and the SLC surface 3 across the exposed peripheral portions 4a and 4b of the substrate 1, and further across the entire side surface of the substrate I. Thus the peripheral edges of the substrate 1 are encompassed with the masking layer. This masking layer can be nickel formed in an electroless plating layer procedure, as known in the prior art.

In production, the BP surface 2 and the SLC surface 3 are formed on the substrate by masking the substrate and then subsequently vapor coating the desired optical coatings to form the optical filter. As shown in FIG. 5, the BP surfaces 2 and 3 are aligned to provide a gap or cutting intervals 11a, 11b between each of the optical coatings. The substrate material 10 is then cut at the middle portions of each of the cutting intervals by means of die blades 12 to form the individual substrates 1.

Subsequently, the substrates 1 are coated with a masking material 5 as shown, for example, in FIG. 6. First the respective optical coatings 2 and 3 are coated with a photoresist coating 8a and 8b that are soluble, for example, with a solvent such as acetone. The portions of the substrate and respective BP peripheral surfaces 2 and SLC peripheral surfaces 3 that are to be coated by the mask are left uncoated by the photoresist coatings 8a and 8b. The structure is then coated with the mask 5 such as nickel in, for example, an electroless plating method of dipping the substrate form into liquid nickel. Subsequently, after the desired coating thickness is achieved, those portions of the mask layer 9 that overlay the resist coatings 8a and 8b are removed with the solvents, along with the resist coating, to expose the desired portions of the BP surface 2 and SLC surface 3. In this embodiment, not only are the BP surfaces 2 and SLC surfaces 3 recessed from the peripheral edges of the substrate 1 to prevent any tipping problem during the cutting step, but further, the entire circumference of the substrate and optical coatings are encompassed with the masking layer 5 to reflect infrared radiation, thereby preventing any optical noise resulting from optical radiation contacting the edges of the coating layers.

In summary, a specialized optical filter and its relationship to a masking layer is disclosed for particular application in measuring instruments that determine the components of, for example, combustion gases. The optical filter is sized to meet the requirements of these measuring instruments, and the BP surface and SLC surface of the optical filter cooperate to provide the desired transmission of infrared rays for the measurement purposes. The manufacturing of the resulting optical filters of the masking layers have a reduced tolerance in the positioning and sizing of the respective BP surface and SLC surface. The masking layer can be formed by a number of different steps, and a preferred masking layer includes a chromium layer with an overlaying layer of gold.

While the above features of the present invention teach both the structure of an optical filter assembly and the method of making the same, it should be readily appreciated that it would be possible to deviate from the above embodiments of the present invention and, as will be readily understood by those skilled in the art, the invention is capable of many modifications and improvements within the scope and spirit thereof. Accordingly, it will be understood that the invention is not to be limited by the specific embodiments, but only by the spirit and scope of the appended claims.

What is claimed is:

1. An improved optical filter comprising:
   a substrate with peripheral sides for transmitting infrared wavelengths of optical radiation;
   a first coating layer on one side of the substrate to effect the transmission of the infrared wavelengths, and
   a third masking coating layer extending about and over peripheral edges of the first and second coating layers and adjacent the substrate peripheral sides to block the infrared wavelengths, whereby optical noise resulting from optical radiation contact with the edges of the coating layers can be eliminated.

2. The optical filter of claim 1 wherein the third masking coating layer encompasses the peripheral sides of the substrate.

3. The optical filter of claim 1 wherein the third masking coating layer is formed of a first layer of Cr and a second layer of Au.

4. The optical filter of claim 1 wherein the first and second coating layers are spaced inward from the peripheral sides of the substrate.

5. The optical filter of claim 1 wherein the substrate peripheral sides are exposed and the third masking coating layer sandwiches the substrate adjacent the peripheral sides.

6. The optical filter of claim 1 wherein the substrate is silicon.

7. An improved optical filter comprising:
   a substrate with a first and second surface and peripheral sides transparent to predetermined wavelengths of optical radiation;
   a first coating layer on the first surface forming a first band-pass of the substrate filter transmissible to infrared radiation and spaced inward from the substrate peripheral sides;
   a second coating layer on the second surface of the substrate forming a second band-pass filter and spaced inward from the substrate peripheral sides, and
   a third masking coating layer extending about and over peripheral edges of the first and second coating layers and adjacent the substrate peripheral sides to reflect infrared radiation, whereby optical noise resulting from infrared radiation contact with the edges of the coating layers can be eliminated.

8. The optical filter of claim 7 wherein the third masking coating layer encompasses the peripheral sides of the substrate.

9. The optical filter of claim 8 wherein the third masking coating layer is formed of a first layer of Cr and a second layer of Au.

10. The optical filter of claim 8 wherein the first coating layer is substantially thinner than the second coating layer, and the second coating layer is multilayered with layers of germanium and silicon monoxide.

11. The optical filter of claim 7 wherein the substrate is silicon.

12. In a measuring instrument for measuring the components in combustion gases by transmitting a light through a chamber containing combustion gases and detecting the effect of the components on the transmission of predetermined wavelengths of the light through the combustion gases, the improvement being an optical filter assembly mounted on the chamber, comprising:
   a substrate with a first and second surface and peripheral sides transparent to predetermined wavelengths of optical radiation;
   a first coating layer on the first surface to form a band-pass filter transmissible to infrared radiation;
   a second band-pass filter to remove predetermined radiation that is of a wavelength longer and shorter than infrared radiation, and
   a third masking layer coated to extend over and about peripheral edges of the respective first and second layers and adjacent the substrate peripheral sides to reflect infrared radiation, whereby optical noise resulting from infrared radiation contact with the edges of the coating layers can be eliminated.

13. The measuring instrument of claim 12 wherein the third masking layer encompasses the peripheral sides of the substrate.

14. The measuring instrument of claim 13 wherein the third masking layer is formed of a layer of Cr and a layer of Au.

15. The measuring instrument of claim 13 wherein the first coating layer is substantially thinner than the second coating layer and the second coating layer is multilayered with layers of germanium and silicon monoxide.

16. The optical filter of claim 12 wherein the substrate is silicon.

17. A method of making an optical filter assembly for use in measuring the components in a gas through the effect of the components on the transmission of predetermined wavelengths of radiation through the gas, comprising the steps of:
   providing a substrate transparent to predetermined wavelengths of radiation;
   exposing predetermined segments of a first surface of the substrate to a deposition of a first coating layer to form a first filter layer;
   exposing a second surface of the predetermined segments to a deposition of a second coating layer to form a second filter layer;
   cutting the coated substrate into individual portions, the cutting being performed on the substrate in areas not coated by the filter layers, and
   exposing only edges of each of the respective filter layers and coating the edges with a masking layer to extend over and about the edges, the masking layer preventing transmission of the predetermined wavelengths, whereby optical noise resulting from radiation contact with the edges of the first and second filter layers can be eliminated.

18. The method of claim 17 further including depositing layers of Ge and SiO on the second coating layer.

19. The method of claim 17 further including coating the masking layer with a layer of Cr and an overlaying layer of Au.

20. The method of claim 19 further including protecting the first and second coating layers with a coating of photoresist, plating the masking layer over the entire substrate, and removing the photoresist layer to expose the first and second coating layers.

21. The method of claim 17 further including providing a silicon substrate.

22. The method of claim 21 wherein the deposition of the first and second coating is done by one of a vapor and sputtering coating procedure.

23. An improved optical filter comprising:
a substrate with peripheral sides transparent to predetermined wavelengths of optical radiation;
a first coating layer on one side of the substrate to effect the transmission of the predetermined wavelengths;
a second coating layer on another side of the substrate to effect the transmission of the predetermined wavelengths, and
a third masking coating layer extending about and over peripheral edges of the first and second coating layers and adjacent the substrate peripheral sides to block the predetermined wavelengths, the third masking coating layer is formed of a first layer of Cr and a second layer of Au, whereby optical noise resulting from optical radiation contact with the edges of the coating layers can be eliminated.

24. An improved optical filter comprising:
a substrate with peripheral sides transparent to predetermined wavelengths of optical radiation;
a first coating layer on one side of the substrate to effect the transmission of the predetermined wavelengths;
a second coating layer on another side of the substrate to effect the transmission of the predetermined wavelengths, wherein the first and second coating layers are spaced inward from the peripheral sides of the substrate, and
a third masking coating layer extending about and over peripheral edges of the first and second coating layers and adjacent the substrate peripheral sides to block the predetermined wavelengths, whereby optical noise resulting from optical radiation contact with the edges of the coating layers can be eliminated.

25. An improved optical filter comprising:
a substrate with peripheral sides transparent to predetermined wavelengths of optical radiation;
a first layer on one side of the substrate to effect the transmission of the predetermined wavelengths;
a second coating layer on another side of the substrate to effect the transmission of the predetermined wavelengths, and
a third masking coating layer extending about and over peripheral edges of the first and second coating layers and adjacent the substrate peripheral sides to block the predetermined wavelengths, whereby optical noise resulting from optical radiation contact with the edges of the coating layers can be eliminated, wherein the substrate peripheral sides are exposed and the third masking coating layer sandwiches the substrate adjacent the peripheral sides.

* * * * *